Oct. 7, 1969   LA RON O. QUICKSTAD   3,470,965
GROUND WORKING IMPLEMENT WITH WING SECTIONS
HINGED TO CENTER SECTION
Filed Dec. 22, 1966   4 Sheets-Sheet 4
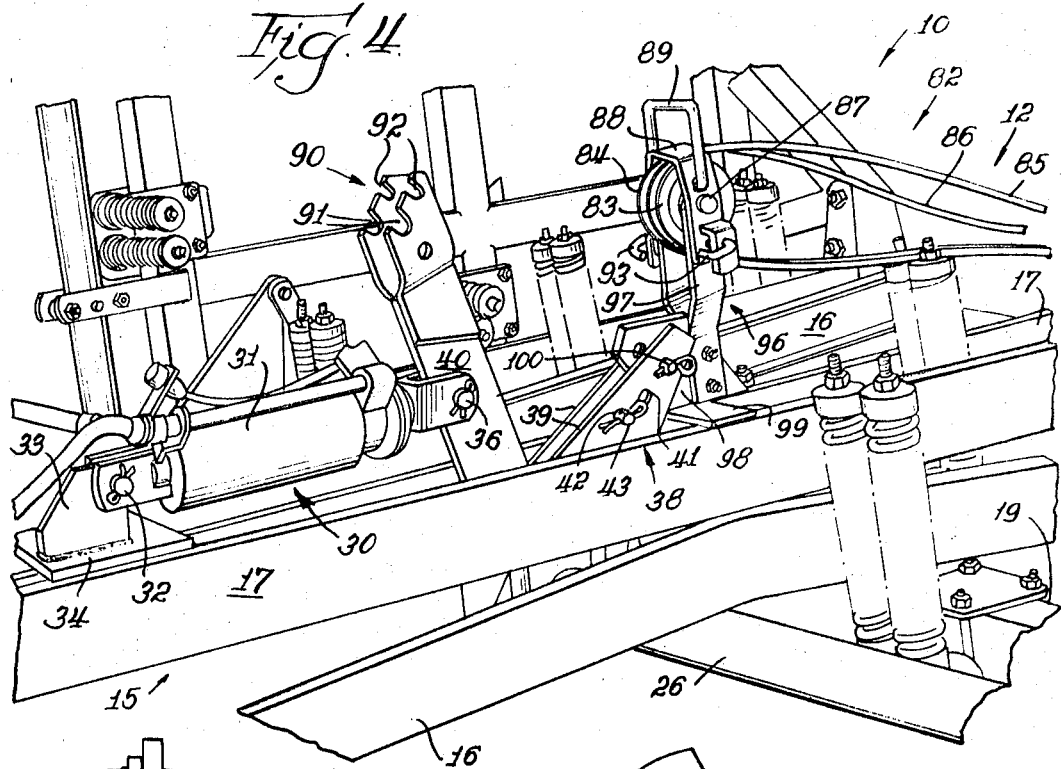
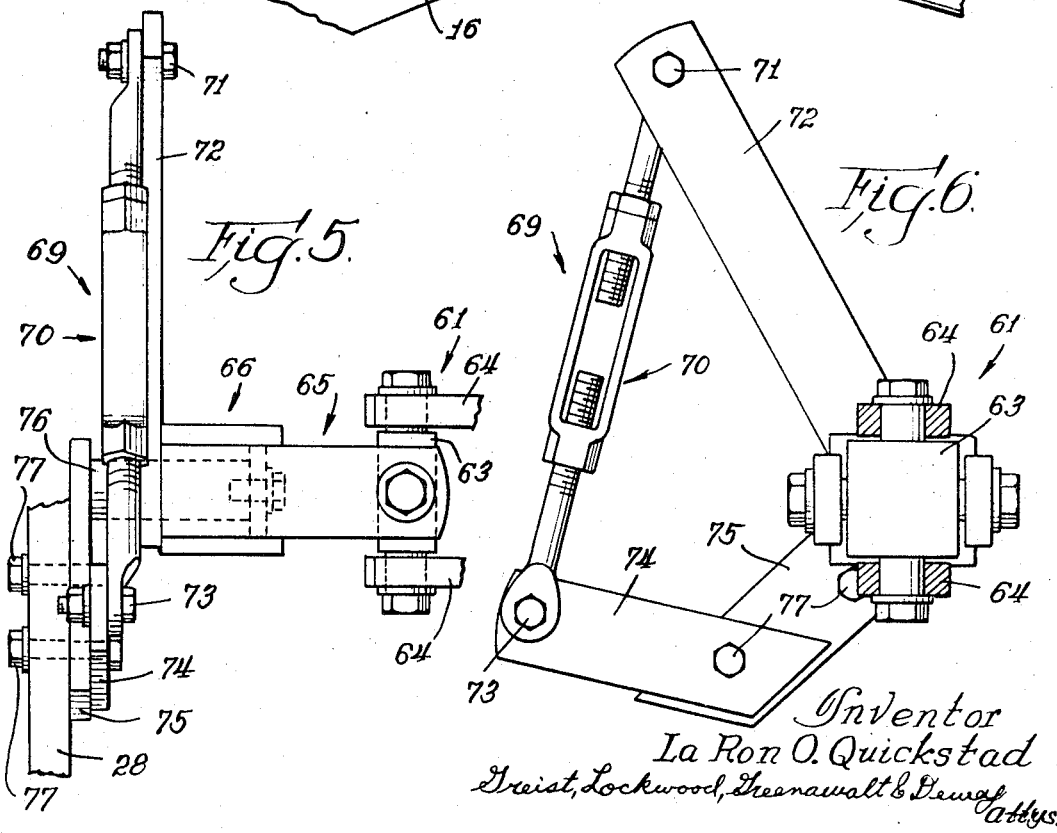
Inventor
La Ron O. Quickstad
Greist, Lockwood, Greenawalt & Dewey
Attys.

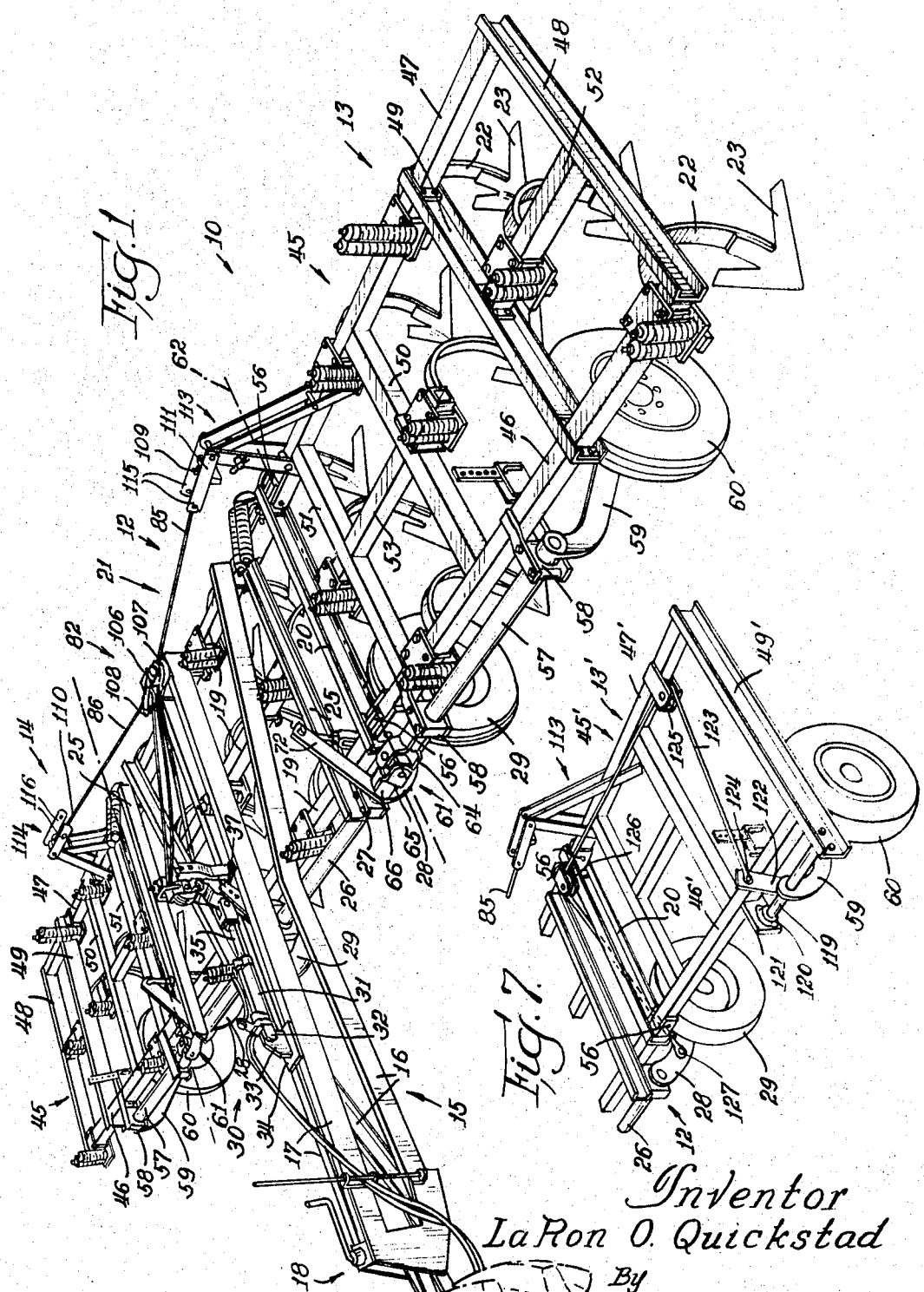

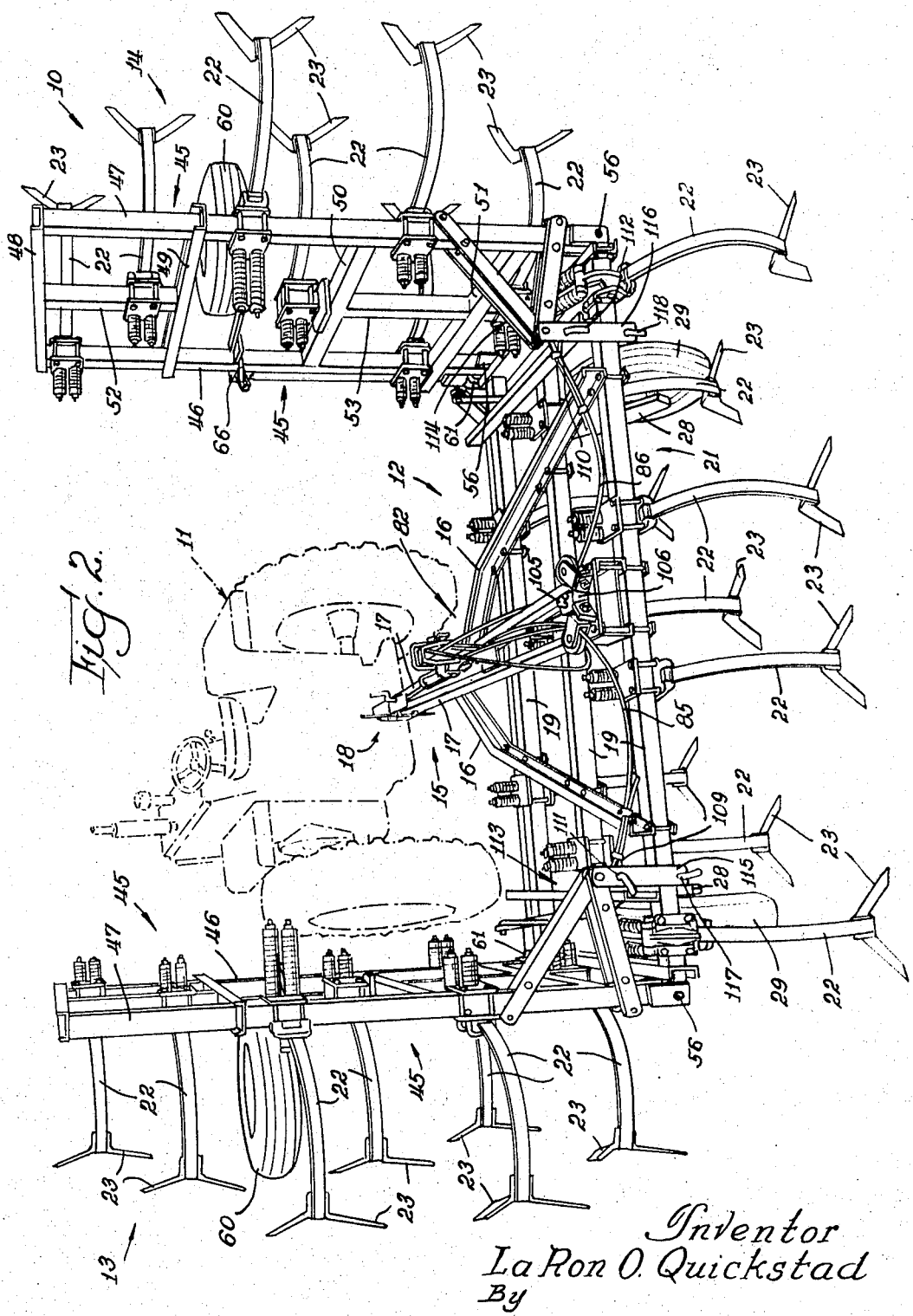

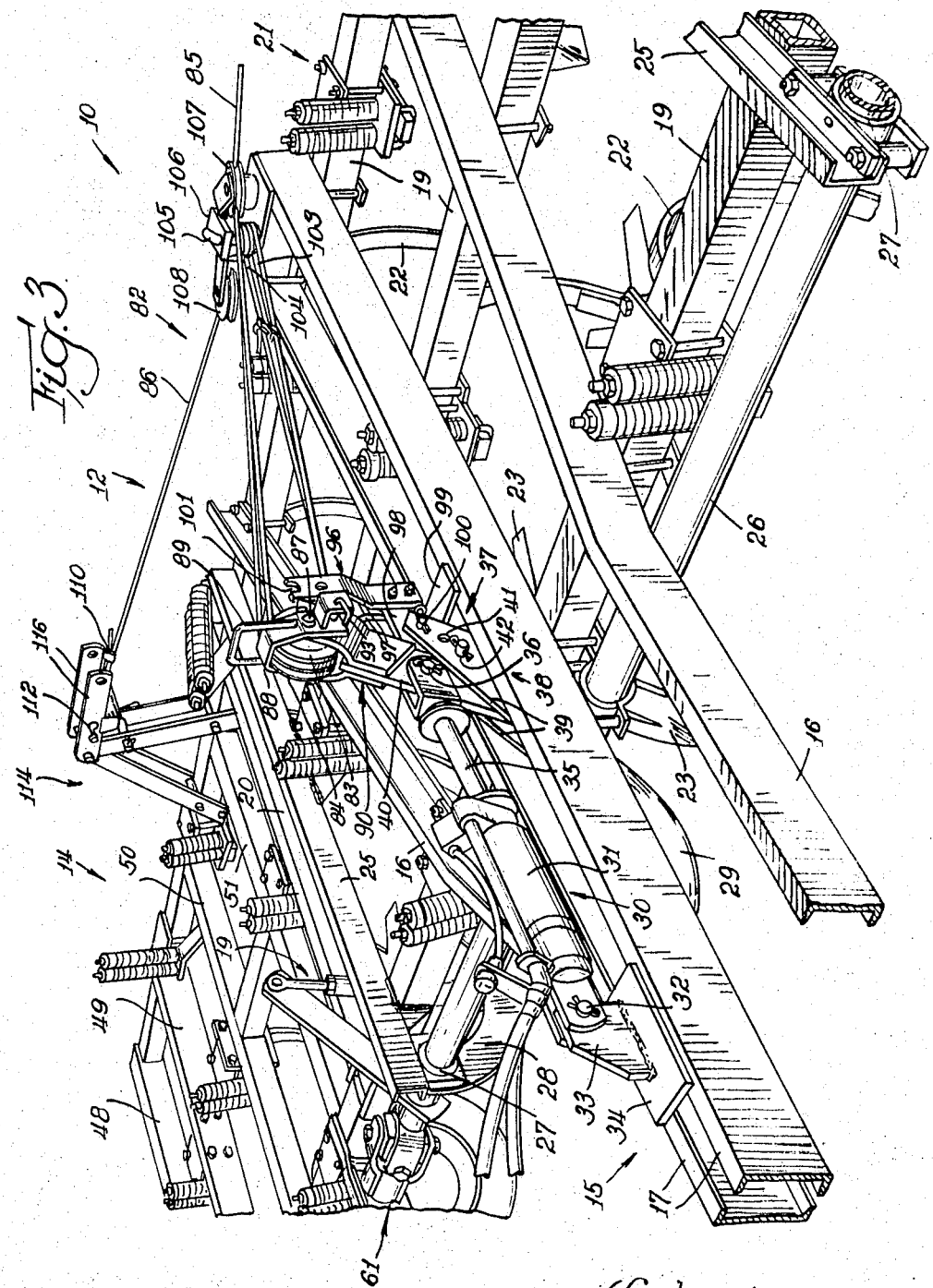

United States Patent Office 3,470,965
Patented Oct. 7, 1969

3,470,965
GROUND WORKING IMPLEMENT WITH WING SECTIONS HINGED TO CENTER SECTION
La Ron O. Quickstad, South Bend, Ind., assignor to Oliver Corporation, Chicago, Ill., a corporation of Delaware
Filed Dec. 22, 1966, Ser. No. 609,704
Int. Cl. A01b 63/14, 65/00; B62d 53/00
U.S. Cl. 172—311                    12 Claims

ABSTRACT OF THE DISCLOSURE

The forec of gravity acting on the center and wing sections of a ground engaging implement in their elevated positions is utilized to raise the wing sections simultaneously or seqeuntially for transport.

---

This invention relates, generally, to ground working implements and it has particular relation to such implements having a center ground working tool carrying section with wing ground working tool carrying sections hinged to opposite sides thereof.

Various arrangements have been used for interconnecting the wing sections of an articulated ground working implement to its center section and for raising the wing sections for transport. Relatively large and expensive hydraulic operators and mechanical linkages have been mounted on the implement for this purpose. Also mechanical winch lifts and cable and pulley systems have been arranged for operation by a detached tractor which is connected to pull on wing section raising cables.

Among the objects of this invention are: To provide new and improved means for raising the wing sections of a ground working implement for transport; to utilize the force of gravity acting on the implement for this purpose; to arrange for the force applying means that is employed for elevating the center and wing sections to be assisted by the force of gravity in raising the wing sections; to employ for the force applying means a hydraulic operator that can be controlled from the tractor while it is connected to the implement with the hydraulic operator being arranged to extend in order to elevate the implement with the wing sections in normal extended position with respect to the center section and to contract to lower the implement and, when desired, simultaneously to raise one or the other or both of the wing sections for transport; to interconnect the center section and arm means rotatable with a rock shaft thereon by the hydraulic operator for elevating the implement and to mount a part of force transmitting means on the arm means with another part of the force transmitting means being connected to one or the other or both of the wing sections for raising them on lowering of the implement by the hydraulic operator and the force of gravity; to employ for the force transmitting means a cable interconnecting each wing section and the center section with the cable being trained over a pulley on the arm means extending from the rock shaft on the center section; to provide the arm means by a first arm secured to the rock shaft on the center section and carrying a stop and a second arm rotatably mounted on the rock shaft, connected to the hydraulic operator and arranged to be moved thereby into engagement with the stop to elevate the implement; to detachably mount the pulley or pulleys on the distal end of the second arm; to provide a stand on the center section for receiving the pulley or pulleys on removal from the second arm; and to mount a rock shaft on each wing section in endwise relation to the rock shaft on the center section when the sections are in horizontal alignment and to adjustably interconnect these rock shafts at their juxtaposed ends by universal joints.

In accordance with this invention the wing ground working tool carrying sections of a ground working implement are hinged to the ground working tool carrying center section which is tractor drawn. Rock shafts carrying ground engaging wheels offset from their axis of rotation are rotatably mounted on each section in end to end relation with the juxtaposed ends of the rock shafts adjustably interconnected by universal joints the axes of which are the respective hinge axes of the wing sections on the center section. A first arm with a stop is secured to and extends radially from the rock shaft on the center section while a stop engaging second arm is rotatably mounted on this rock shaft and has one end of a hydraulic operator connected thereto while the other end is connected to the frame of the center section. Expansion of the hydraulic operator rotates the rock shafts and elevates the center and laterally extending wing sections. Detachably mounted on the distal end of the second arm is a pair of pulleys over which a pair of cables are trained both of which are anchored at one end to the frame of the center section while the other ends are detachably connected to masts on the wing sections. With the center and wing sections elevated by extension of the hydraulic operator and the cables taut, on contraction of the hydraulic operator, the force of gravity acting on the elevated center and wing sections is transmitted through the first arm and stop to the second arm carrying the pulleys and thereby tensions the cables to raise the wing sections simultaneously with the lowering of the center and wing sections. Pressure applied to the hydraulic operator to contract it augments the force of gravity in raising the wing section. Where the force of gravity and the force capable of being exerted by the hydraulic operator are insufficient to raise both wing sections for transport at the same time, only one of the cables is connected to a wing section and it is raised in the manner described. Then the center and wing sections are again elevated by the hydraulic operator, the cable is connected to the other wing section and the operation is repeated. Only a single cable can be provided for connection first to one and then to the other wing section and a single pulley can be detachably mounted on the second arm if both wing sections are not to be raised simultaneously.

In the drawings: FIG. 1 is a perspective view of a ground work implement in which this invention is embodied, the implement being shown in the elevated position with the wing sections extending laterally from the center section, the view being taken looking from front to rear. FIG. 2 is a perspective view of the ground working implement shown in FIG. 1 with the wing sections raised for transport and the implement elevated, the view being taken looking generally from the rear. FIG. 3 is a perspective view, at an enlarged scale, of the central portion of the ground working implement as shown in FIG. 1. FIG. 4 is a perspective view, at an enlarged scale, of the central portion of the ground working implement with the pulleys and cables employed for raising the wing sections being shown in their stored position. FIG. 5 is a view, in rear elevation and at an enlarged scale, of the left universal joint that is employed for adjustably interconnecting the rock shafts on the left and center wing sections. FIG. 6 is a view, in side elevation, of the construction shown in FIG. 5, a portion of the universal joint being shown in section. FIG. 7 shows a modified wing wheel raising construction.

In FIGS. 1, 2 and 3 the reference character 10 designates generally a ground working implement that is arranged to be drawn by a tractor that is indicated, generally, at 11. The ground working implement 10 includes a center ground working tool carrying section that is indicated, generally, at 12 to the sides of which left and right wing ground working tool carrying sections 13 and 14 are hinged to provide flexibility of the implement 10 as it is drawn by the tractor 11 for ground working purposes. Also they are hinged for transport to reduce the overall width of the implement 10. Except for left and right details of construction, the wing sections 13 and 14 are duplicates of each other.

The tractor 11 is arranged to be detachably connected to a center pole that is indicated, generally, at 15. The center pole 15 includes lower and outer channel beams 16 and upper and inner channel beams 17 with a tractor hitch, shown generally at 18 in FIG. 1, provided at the front end for detachable connection to the tractor 11.

The channel beams 16 and 17 extend over and are suitably secured to longitudinal frame members 19 that extend between and are secured to transverse end frame members 20 which together comprise a center frame, indicated generally at 21, for the center section 12. Spring loaded shanks 22 are suitably secured to the longitudinal frame members 19 and carry ground working tools in the form of sweeps 23. Other ground working tools, such as chisel points, etc., can be secured to the spring loaded shanks 22 for ground working purposes.

Suitably secured to the longitudinal frame members 19, overlying them and projecting forwardly therefrom, are support channels 25. A rock shaft 26 is journaled at 27 on the forward projecting ends of the support channels 25. Suitably secured to the rock shaft 26 are wheel arms 28 for rotation therewith. At their distal ends the wheel arms 28 have ground engaging wheels 29 suitably rotatably mounted thereon. By rotating the rock shaft 26 in a direction to move the wheel arms 28 and ground engaging wheels 29 in a direction away from the center section 12 in a manner to be described, the center section 12 and wing sections 13 and 14 are elevated with respect to the ground. Rotation in the opposite direction effects a lowering of the sections 12, 13 and 14 to cause the sweeps 23 to engage the ground.

For elevating and lowering the center and wing sections 12, 13 and 14 of the ground working implement 10 force applying means in the form of a hydraulic operator, indicated at 30, is employed. The hydraulic operator 30 is arranged to be energized by hydraulic fluid under pressure that is supplied by a suitable pump (not shown) that is mounted on the tractor 11 and is arranged to be controlled by the operator thereof. The hydraulic operator 30 acts against the force of gravity in elevating the center and wing sections 12, 13 and 14 and controllably resists the force of gravity in lowering them. The hydraulic operator 30 is of conventional construction and includes a cylinder 31 that is pivoted at 32, FIGS. 3–4, on an upstanding plate 33 which is carried by a support plate 34 that is secured, as by welding, to the upper flanges of the channel beams 17. Application of hydraulic pressure to the cylinder 31 at one end or the other causes extension or contraction of a piston rod 35 that is pivotally connected at 36 to rotate arm means indicated, generally, at 37. More specifically the arm means 37 comprises a first arm 38 that is formed by a pair of plates 39 which are secured to the rock shaft 26 for rotation therewith. The arm means 37 also includes a second arm 40 in the form of a plate that is located between the plates 39 and at its lower end is freely rotatably mounted on the rock shaft 26. The piston rod 35 is pivotally connected at 36 to the second arm 40. The plates 39 are provided with registering openings 41 and 42 for receiving in one or the other stop means 43 in the form of a removable pin. The extent to which the center and wing sections 13 and 14 are elevated or the depth to which the sweeps 23 are positioned for ground working purposes depends upon the location of the stop means 43 in one or the other of the registering holes 41 and 42. For maximum elevation and lesser depth of penetration of the ground, the stop means 43 is positioned in the holes 42 as shown in FIG. 4. For elevation to a lower height of the center and wing sections 12, 13 and 14 and greater ground penetration by the sweeps 23, the stop means 43 is positioned in the registering holes 41.

When hydraulic pressure is applied to the cylinder 31 to extend the piston rod 35, the second arm 40 is rotated relative to the rock shaft 26 until it engages the stop means 43. On further application of hydraulic pressure to the cylinder 31, the first arm 38 formed by the pair of plates 39 transmits the force exerted by the hydraulic operator 30 to the rock shaft 26 and rotates it relative to the center section 12. This elevates the center section 12 as well as the wing sections 13 and 14 against the force of gravity.

Since the left and right wing sections 13 and 14 are essentially duplicates of each other, except for left and right constructions, a description of one will suffice for both. Each comprises a frame that is indicated, generally, at 45 which is formed by front and rear longitudinal frame members 46 and 47 which are interconnected by transverse frame members 48, 49, 50 and 51. The frame 45 also includes intermediate longitudinal frame members 52 and 53. It will be understood that the various frame members forming the frame 45 are suitably secured together, preferably by welding. The spring loaded shanks 22 carrying the ground working tools in the form of sweeps 23 are secured, as shown, to the longitudinal frame members 46, 47, 52 and 53.

In order to permit the wing sections 13 and 14 to follow the contour of the ground and to provide for raising them for transport, the inner ends of the front and rear longitudinal frame members 46 and 47 are hinged at 56 to the adjacent transverse frame member 20 of the center frame 21 which forms a part of the center section 12. Forwardly of each front longitudinal frame member 46 a rock shaft 57 is journaled as indicated at 58. A wheel arm 59 is secured to the outer end of each rock shaft 57 for supporting at its distal end a ground engaging wheel 60. Interconnecting the juxtaposed ends of the rock shaft 26 on the center section 12 and the rock shafts 57 on the wing sections 13 and 14 are universal joints that are indicated, generally, at 61. The axis of each universal joint 61 coincides with the axis, indicated by broken line 62, through the pivots of the hinges 56 whereby each wing section is connected to the respective side of the center section 12.

FIGS. 5 and 6 show in more detail the construction of the universal joint 61 and specifically with reference to the universal joint 61 interposed between the left end of the rock shaft 26 and the right end of rock shaft 57 on the left wing section 13. It includes a universal block 63 which has a bifurcated connection 64 to the rock shaft 57. Another bifurcated connection 65 interconnects the universal block 63 and a universal assembly that is indicated at 66. It is desirable to provide for relative adjustment between the rock shaft 26 and the rock shafts 57 for the purpose of aligning the ground engaging wheels 60 with the ground engaging wheels 29 on the center section 12. For this purpose adjustable means, shown generally at 69, is provided between the universal joint 61 and the adjacent end of the rock shaft 26. Adjusting means 69 includes a turnbuckle assembly that is indicated, generally, at 70 and is connected at one end at 71 to an arm 72 which is secured to and extends from the universal assembly 66. The turnbuckle assembly 70 is connected at its other end at 73 to a plate 74 which is suitably secured, as by welding, to an arm 75 which carries a stub shaft 76 that is journaled in the universal assembly 66 and is suitably secured thereto against endwise movement. Cap bolts 77 are employed for securing the plate 74 and arm 75 to the adjacent wheel arm 28 which, it will be recalled, is secured to the rock shaft 26. By extending or contracting the turnbuckle assemble 70, it is possible to rotate the rock shaft 57 with respect to the rock shaft 26 and thus provide the desired adjustment and alignment of each ground engaging wheel 60 with the ground engaging wheels 29.

It will be understood that, with the wing sections 13 and 14 in extended relation as shown in FIG. 1, the extension and contraction of the hydraulic operator 30 is effective to elevate not only the center section 12 but also the wing sections 13 and 14.

For transport purposes the wing sections 13 and 14 are arranged to be raised from their horizontal positions shown in FIG. 1 to the vertical positions shown in FIG. 2, thereby decreasing the effective overall length of the implement 10. For swingably raising wing sections 13 and 14 to the position shown in FIG. 2 force transmitting means, shown generally at 82, is employed. The force transmitting means 82 includes pulleys 83 and 84 and cables 85 and 86 which are trained thereover. The pulleys 83 and 84, FIGS. 3–4, are mounted to rotate about a common axis on a shaft 87 the ends of which extend through the sides of an inverted U-shaped bracket 88 to which an inverted U-shaped handle 89 is secured for shifting the assembly from the operative position as shown in FIG. 3 to the inoperative position shown in FIG. 4. The bracket 88, carrying the pulleys 83 and 84 with the cables 85 and 86 trained thereover, is arranged to be detachably mounted on a bifurcated bracket, indicated generally at 90 in FIG. 4, which is mounted on the distal end of the second arm 40 to which the piston rod 35 is pivotally connected at 36. Slots 91 and 92 are formed in the furcations of the bracket 90 to receive the ends of the shaft 87 in alternate position. Removable pins 93 are arranged to secure the bracket 88 with the pulleys 83 and 84 thereon either on the bracket 90, as shown in FIG. 3, or on a pulley stand as indicated in FIG. 4 in which the pulleys 83 and 84 are mounted on what is termed a non-operative position. The pulley stand 96 includes bifurcated bracket means 97 secured at the lower end to opposite sides of a locking plate 98 which extends upwardly from a support plate 99 which is secured, as by welding, to the flanges of the inner channel beams 17. A locking pin 100 is arranged to be placed in suitable registering openings in the plates 39 forming the first arm 38 and through a suitable opening in the locking plate 98 for holding the rock shaft 26 in the position in which the implement 10 is elevated for transport purposes. Slots 101 in the furcations of the bracket means 97 are arranged to receive the ends of the shaft 87 when the bracket 88 and parts mounted thereon are detached from the bracket means 90 on the second arm 40 and placed in the alternate position as shown in FIG. 4 where the pins 93 are employed for holding the assembly in non-operative position on the pulley stand 96.

As shown in FIGS. 2 and 3, with the bracket 88 mounted on the bracket 90 at the distal end of the second arm 40, one end 103 and 104 of each of the cables 85 and 86 is secured by an anchor pin 105 to a pulley support bracket 106 that is suitably secured to the upper side of the rear ends of the channel beams 17. Guide pulleys 107 and 108 are suitably rotatably mounted on the support bracket 106 to direct the cables 85 and 86 from the pulleys 83 and 84 outwardly away from the support bracket 106 with the other ends 109 and 110 of the cables 85 and 86 being detachably connected by cable pins 111 and 112 to masts 113 and 114 which are secured to and carried by the frames 45 of the left and right wing sections 13 and 14. The cable pins 111 and 112 extend through laterally extending plates 115 and 116 which form parts of the masts 113 and 114 and which, as indicated in FIG. 2, in the raised positions of the wing sections 13 and 14 are arranged to straddle the rear longitudinal frame member 19 of the center frame 21. Wing lock pins 117 and 118 extend through suitable openings in the distal ends of the plates 115 and 116 to lock the wing sections 13 and 14 in their raised positions.

For raising the wing sections 13 and 14 from their horizontal operative positions shown in FIG. 1 to the raised position shown in FIG. 2 for transport, the bracket 88 carrying the pulleys 83 and 84 with the cables 85 and 86 trained thereover is shifted from the pulley stand 96, FIG. 4, to the bracket 90, FIG. 3, on the upper end of the second arm 40 after the hydraulic operator 30 has been extended to facilitate this transfer while the ends 109 and 110 of the cables 85 and 86 are connected to the masts 113 and 114 by the cable pins 111 and 112 and the cables 85 and 86 are taut. Also, if the locking pin 100 had been inserted in the position shown in FIG. 4, it is withdrawn. Then hydraulic pressure is applied to the cylinder 31 to contract the piston rod 35 into the cylinder 31. This is accompanied by rotation of the arm means 37 comprising the second arm 40 which is connected directly to the piston rod 35 and the first arm comprising the plates 39 which are secured to the rock shaft 26. The force of gravity acting on the center and wing sections 12, 13 and 14 assists the hydraulic operator 30 in rotating the arm means 37 in a direction to lower the implement 10. Simultaneously the cables 85 and 86 are tensioned and force is applied thereby to the masts 113 and 114 to rotate them at the hinges 56 and raise them to the transport positions shown in FIG. 2. After they have been raised to these positions, with the plates 115 and 116 straddling the rear longitudinal frame member 19, the wing lock pins 117 and 118 are inserted to hold the wings 13 and 14 in their raised positions.

In the event that the force capable of being exerted by the hydraulic operator 30 as assisted by the force of gravity acting downwardly on the center and wing sections 12, 13 and 14 is insufficient to raise the wing sections 13 and 14 simultaneously, then, with the implement 10 in the elevated position, one or the other of the cable pins 111 or 112 can be withdrawn so that only one or the other of the cables 85 or 86 is tensioned when the hydraulic operator 30 has pressure applied thereto for contracting the piston rod 35. After one of the wing sections 13 or 14 has been raised, the sequence of operations is repeated for the other wing section.

If desired, only a single pulley 83 or 84 can be employed together with a single cable 85 or 86 and a single guide pulley 107 or 108. The single cable can be connected first to one of the masts 113 and 114 for raising the associated wing 13 or 14. Then this one cable is disconnected from the one mast and is connected to the other and the raising operation repeated.

The wheel arms 28 can be individually pivoted on the center frame 21 instead of being mounted for rotation with the rock shaft 26. In that case the wheel arms 28 are interconnected for conjoint rotation by cables and pulleys with suitable connection being made to the second arm 40.

FIG. 7 shows a modified construction in which the universal joints 61 are not employed for extending the rock shaft 25 to the wing sections 13 and 14. In FIG. 7 left wing section 13' is illustrated which corresponds to left wing section 13 and is hinged at 56 to the center section 12. Frame 45' of wing section 13' includes front and rear longitudinal frame members 46' to 47' and transverse frame member 49'. Wheel arm 59, carrying ground engaging wheel 60, is mounted for rotation with a shaft 119 that is journaled at one end on the inner side of the transverse frame member 49' and at the other end in a bearing 120 carried by a support plate 121 extending forwardly from frame member 46'. An operating arm 122 is secured to the wheel arm 59 and a cable 123 has one end connected at 124 to the distal end of the operating arm 122. The cable 123 is trained over a pulley 125, that is carried by frame member 47', and over a pulley 126 that is suitably mounted on frame member 20 of the center section 12. The other end of the cable 123 is connected at 127 to the adjacent wheel arm 28. A similar arrangement is provided for the wing section at the right end of the center section 12. When the rock shaft 26 is rotated by the hydraulic operator 30 in the manner described to elevate the center section 12, the cable 123 is tensioned to apply force through the operating arm 122 and wheel arm 59 to the ground engaging wheel 60 to elevate the left wing section 13' along with the center section 12. In like manner the wing section at the right end of the center section 12 is elevated. When the wing section 13' is to be raised for transport, tension is applied to cable 85 connected to mast 113 and the force of gravity is employed in the manner described to rotate the wing section 13' about hinges 56.

What is claimed as new is:

1. A ground working implement comprising
    a center ground working tool carrying section,
    a wing ground working tool carrying section hinged to one side of said center section,
    a wheel arm rotatably mounted adjacent each end of said center section and a ground engaging wheel on each of said arms,
    means operatively interconnecting said wheel arms for conjoint rotation,
    arm means connected to said means,
    force applying means interposed between said center section and said arm means for rotating said wheel arms to elevate said center and wing section, and
    force transmitting means interconnecting said wing section and said arm means in the elevated position of said center and wing section for applying the force of gravity acting on said center and wing section to said wing section for rotating it toward a vertical position when said force applying means is operated to rotate said wheel arms to lower said center and wing section.

2. The ground working implement according to claim 1 wherein
    a second wing ground working tool carrying section is hinged to the other side of said center section, and
    force transmitting means interconnects said second wing section and said arm means.

3. The ground working implement according to claim 1 wherein said force transmitting means includes
    a pulley carried by said arm means, and
    cable means trained over said pulley, connected at one end to said center section and at the other end to said wing section.

4. The ground working implement according to claim 2 wherein said force transmitting means includes
    a pair of pulleys carried by and rotatable about a common axis on said arm means, and
    cable means trained over each pulley, connected at one end to said center section and at the other end to one of said wing sections.

5. The ground working implement according to claim 4 wherein means are provided for selectively connecting said cable means to the respective wing section to rotate it toward its vertical position while said center and wing sections are being lowered.

6. The ground working implement according to claim 1 wherein
    means detachably mount a part of said force transmitting means on said arm means, and
    means on said center section are provided for receiving said part of said force transmitting means on removal from said arm means.

7. The ground working implement according to claim 1 wherein said means operatively interconnecting said wheel arms includes a rock shaft journaled on said center section with said arm means secured thereto, rotatable therewith and extending radially therefrom.

8. The ground working implement according to claim 7 wherein said arm means includes
    a first arm secured to said rock shaft and carrying stop means, and
    a second arm rotatably mounted on said rock shaft and engaging said stop means in a direction to elevate said center wing section, and
    said force applying means includes a hydraulic operator interposed between said center section and said second arm.

9. The ground working implement according to claim 8 wherein said force transmitting means includes
    a pulley carried by the distal end of said second arm, and
    cable means trained over said pulley, connected at one end to said center section and at the other end to said wing section.

10. The ground working implement according to claim 7 wherein
    a rock shaft is journaled on said wing section endwise of said rock shaft on said center section and has a ground engaging wheel mounted thereon offset from its axis of rotation,
    one end of universal joint means is secured to said rock shaft on said wing section, and
    adjustable means interconnect the other end of said universal joint means and the adjacent end of said rock shaft on said center section.

11. A grounding working implement comprising
    a center ground working tool carrying section,
    a wing ground working tool carrying section hinged to one side of said center section,
    a rock shaft journaled on said center section and having ground engaging wheels mounted thereon offset from its axis of rotation,
    arm means rotatable with and extending radially from said rock shaft,
    force applying means interposed between said center section and said arm means for rotating said rock shaft to elevate said center and wing sections,
    a rock shaft journaled on said wing section endwise of said rock shaft on said center section and having a ground engaging wheel mounted thereon offset from its axis of rotation,
    universal joint means with one end secured to said rock shaft on said wing section, and
    adjustable means interconnecting the other end of said universal joint means and the adjacent end of said rock shaft on said center section.

12. The ground working implement according to claim 11 wherein said arm means includes
    a first arm secured to said rock shaft and carrying stop means, and
    a second arm rotatably mounted on said rock shaft and engaging said stop means in a direction to elevate said center and wing sections, and
    said force applying means includes a hydraulic operator interposed between said center section and said second arm.

References Cited
UNITED STATES PATENTS

| | | | |
|---|---|---|---|
| 3,354,966 | 11/1967 | Jackson | 172—311 |
| 3,362,483 | 1/1968 | Twidale | 172—311 |

ROBERT E. BAGWILL, Primary Examiner

JAMES W. PETERSON, Assistant Examiner

U.S. Cl. X.R.

172—456